Figure 1:
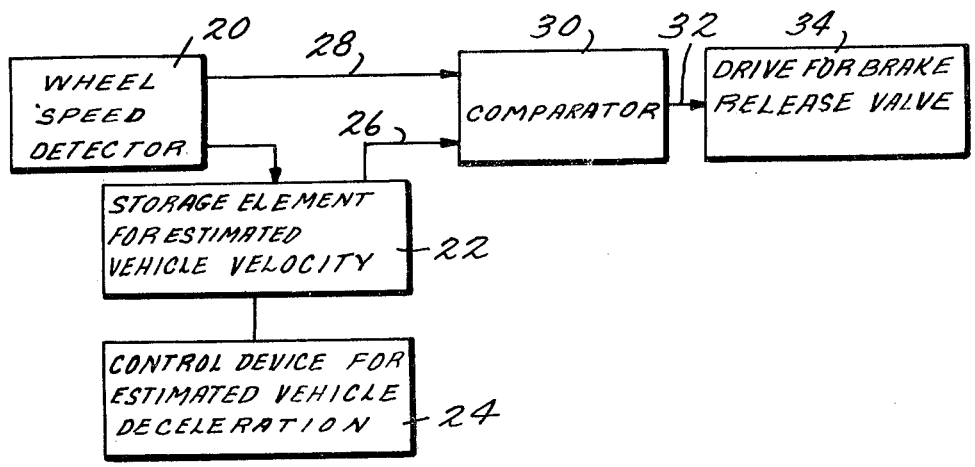

United States Patent [19]

Okamoto et al.

[11] 4,094,556
[45] June 13, 1978

[54] ANTI-SKID SYSTEM FOR A VEHICLE

[75] Inventors: Atutoshi Okamoto, Toyohashi; Koichi Taniguchi, Kariya; Yoshiaki Nakano, Gifu; Koichi Toyama, Toyohashi, all of Japan

[73] Assignee: Nippondenso Kabushiki Kaisha, Kariya, Japan

[21] Appl. No.: 123,228

[22] Filed: Mar. 11, 1971

Related U.S. Application Data

[63] Continuation-in-part of Ser. No. 816,203, Apr. 15, 1969, abandoned, and a continuation-in-part of Ser. No. 816,928, Apr. 17, 1969, abandoned, and a continuation-in-part of Ser. No. 832,192, Jun. 11, 1969, abandoned.

[30] Foreign Application Priority Data

| Apr. 24, 1968 | Japan | 43-27844 |
| Jun. 26, 1968 | Japan | 43-44348 |
| Jun. 28, 1968 | Japan | 43-45381 |
| Jul. 13, 1968 | Japan | 43-49499 |

[51] Int. Cl.$^2$ ............................................. B60T 8/10
[52] U.S. Cl. .................................. 303/109; 188/181 C
[58] Field of Search ............. 180/82 D, 105 E, 82 R; 188/181 C; 303/20, 21, 95, 96, 106, 109, 110, 111; 317/5; 318/52; 324/160–161; 340/263, 53, 62; 244/111; 307/10 R; 361/236, 238, 239, 242

[56] References Cited

U.S. PATENT DOCUMENTS

| 3,245,213 | 4/1966 | Thompson et al. | 303/21 EB |
| 3,260,555 | 7/1966 | Packer | 303/21 EB |
| 3,275,384 | 9/1966 | Hirzel | 303/21 CG UX |
| 3,401,984 | 9/1968 | Williams et al. | 303/21 BE |
| 3,467,443 | 9/1969 | Okamoto et al. | 303/21 BE |
| 3,498,682 | 3/1970 | Mueller et al. | 303/21 BE |
| 3,578,819 | 5/1971 | Atkins | 303/21 P |
| 3,604,760 | 9/1971 | Atkins | 303/21 CG |
| 3,724,916 | 4/1973 | Hirzel | 303/109 |

FOREIGN PATENT DOCUMENTS 909,255  10/1962  United Kingdom ............ 303/21 BE Primary Examiner—Stephen G. Kunin
Attorney, Agent, or Firm—Cushman, Darby & Cushman

[57] ABSTRACT

An improved anti-skid system for a vehicle which effectively utilizes an approximated slip ratio between vehicle or body velocity and wheel velocity to generate a brake release signal for a brake release valve but without actually utilizing a vehicle or body velocity detector. Storage apparatus is used to store a reference signal representing vehicle velocity but actually corresponding to a present or just past maximum value of wheel velocity. Control apparatus is then utilized for removing energy from the storage apparatus at a controlled predetermined rate chosen to approximate the expected vehicle deceleration (but without using an actual vehicle or body deceleration detector) such that the reference signal (capacitor voltage) will continue to accurately represent approximate vehicle velocities even during periods of deceleration. Various exemplary embodiments are described for the control apparatus which may be used to hold the discharge rate constant, to change it from a first low rate to a second high rate during brake release (for compensating inherent time lags in the vehicle brake system) and/or to continuously change the rate in an inverse dependency upon wheel deceleration to even more closely approximate actual vehicle deceleration under variable road conditions. Other features of the improved system may be used to result in rapid oscillatory brake releases as a transition both before and after a more prolonged brake release period to provide for smoother operation of the anti-skid system. Spurious influences of any A.C. ripple components on the detected wheel velocity signal may also be substantially eliminated by using some of the features of this system.

8 Claims, 15 Drawing Figures

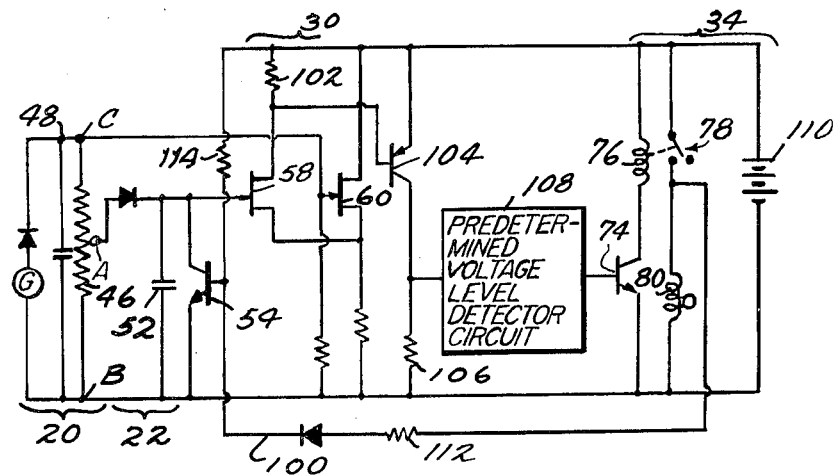
Fig. 6.
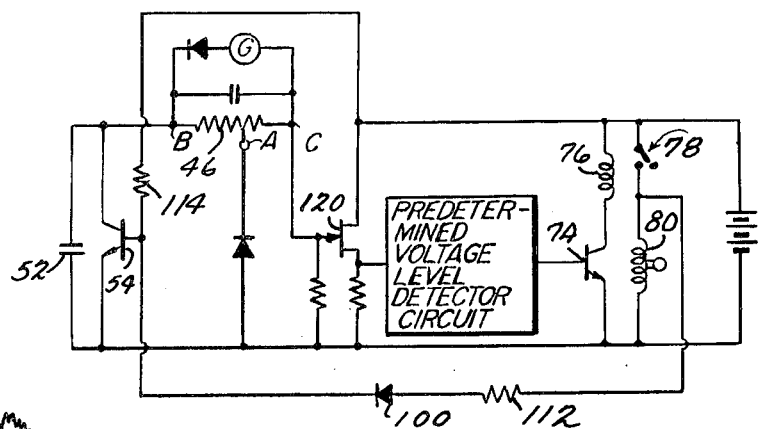
Fig. 7.
Fig. 8.
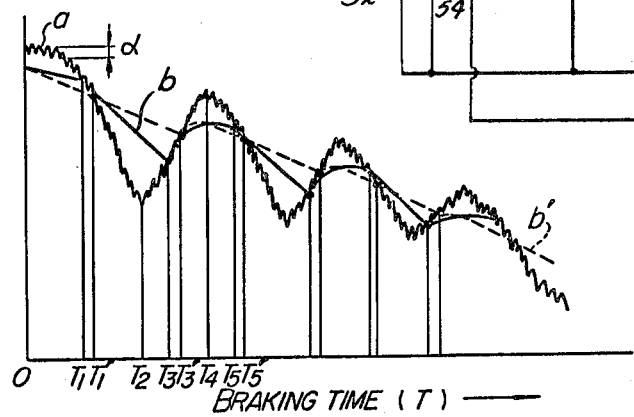
Fig. 5.
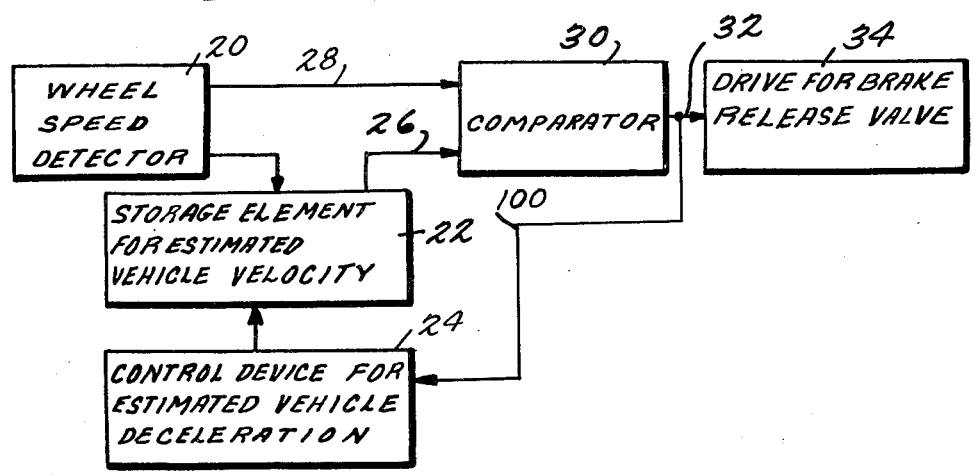

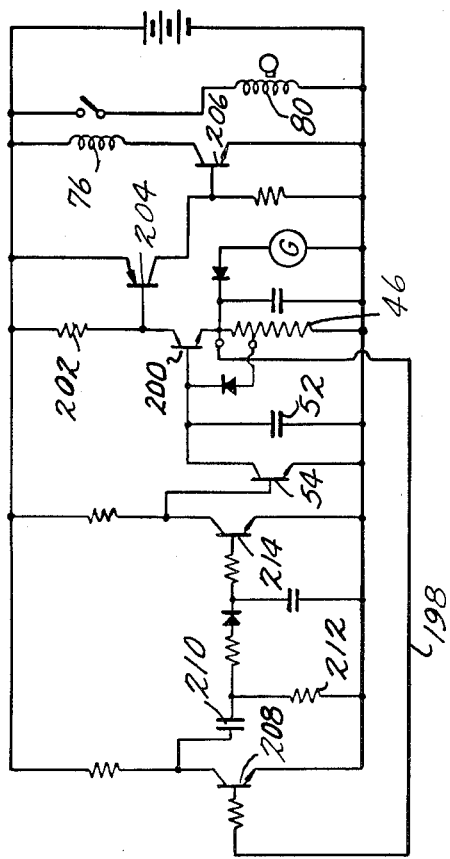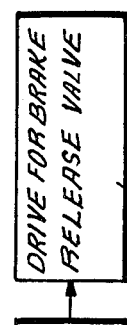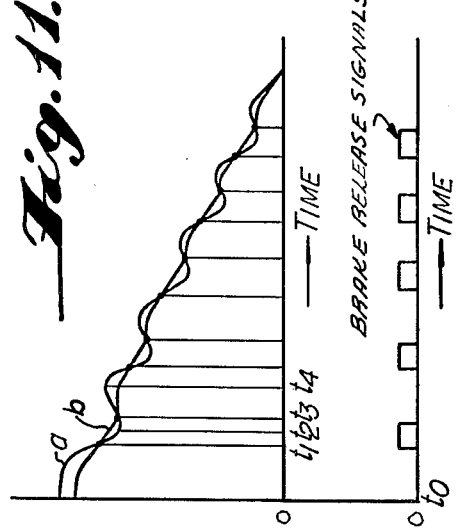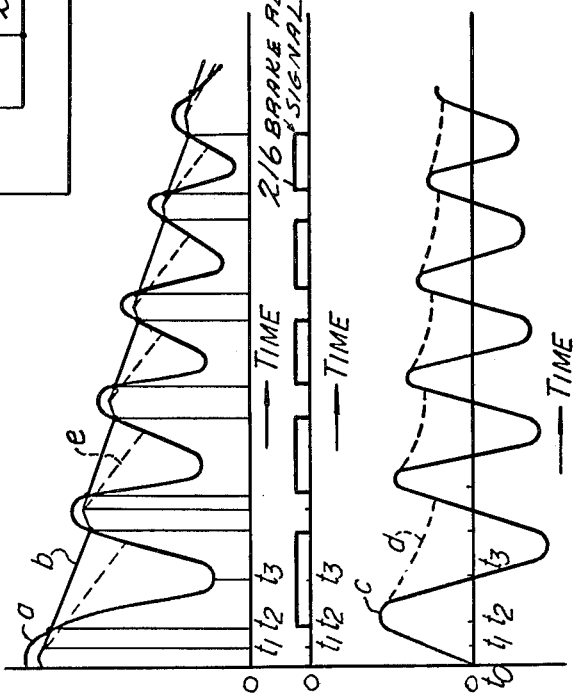

ANTI-SKID SYSTEM FOR A VEHICLE

CROSS REFERENCES TO RELATED APPLICATIONS

This is a continuation-in-part of our earlier copending applications Ser. No. 816,203 filed Apr. 15, 1969; Ser. No. 816,928 filed Apr. 17, 1969; and Ser. No. 832,192 filed June 11, 1969, all of which are now abandoned.

This invention generally relates to anti-skid systems for vehicles. Such anti-skid systems are for the purpose of automatically releasing the breaking force applied to the wheels of a vehicle during braking operations to prevent wheel skidding and thus to insure a safer braking operation.

Some prior art anti-skid systems have merely differentiated a wheel speed signal to obtain a wheel deceleration signal and then have automatically released the vehicle braking force whenever the wheel deceleration exceeded certain predetermined levels. However, because spurious noise signals in the wheel velocity (caused by such things as shifting of transmission, driving on gravel roads, etc.) often cause spurious values of high wheel deceleration and/or acceleration, this type of system often results in unwanted releases of the vehicle brake system.

Other prior art systems have sought to overcome this difficulty, at least in part, by utilizing the difference or slip ratio between wheel velocity and vehicle or body velocity to determine the brake releasing operation of an anti-skid system. However, the provision of such a vehicle velocity detector causes an added expense and complexity which, in turn, results in other undesirable consequences.

For instance, U.S. Pat. No. 3,467,443 - Okamoto teaches a system incorporating a vehicle body deceleration detector which is manually switched into the anti-skid circuit upon vehicle braking. Thus there is the added cost of such a deceleration detector as well as additional failure possibilities resulting from the moving parts of the deceleration detector and the manual switching circuit.

U.S. Pat. No. 2,980,369 - Ruof teaches yet another system which is an apparent variation of the usual excessive wheel deceleration detector but which increases the time constant of his deceleration detector by disconnecting a resistor therefrom upon braking to effectively prolong any brake modifying periods. Thus, spurious brake releases caused by noise signals are inherently enhanced to the detriment of the desired operation.

U.S. Pat. No. 3,026,148 - Ruof also teaches a deceleration detecting system for prolonging brake modifying periods by providing a degree of positive feedback around an amplifier to variably shunt the input thereof. Thus, this prior art system is also relatively sensitive to noise signals.

Accordingly, it is an object of this invention to provide an improved anti-skid system for a vehicle which effectively utilizes an approximate slip ratio between vehicle velocity and wheel velocity to generate a brake release signal for a brake release valve but without actually utilizing a vehicle velocity or deceleration detector.

Under ideal conditions, the vehicle will decelerate at an approximately constant rate during a braking period from its initial maximum velocity. Before the braking operation begins, the vehicle wheels will presumably be free from any substantial degree of skidding with respect to the road surface and therefore, the wheel velocity prior to the braking operation bears a direct relationship to the actual vehicle velocity at this time.

Thus, it has been discovered that a separate vehicle velocity detector is not necessary if a storage means is utilized to store the present or just past maximum vehicle velocity and if control means are then used for decreasing the stored signal by a controlled rate approximating the expected vehicle deceleration. In this manner, the reference signal maintained in the storage means always approximately represents the actual vehicle velocity and thus this reference signal may be compared with the wheel velocity to obtain the desired slip ratio between the wheel and vehicle velocities.

While one of the exemplary embodiments described below results in a constant expected vehicle deceleration, other exemplary embodiments utilize a variable control means connected to the storage means for obtaining other benefits in addition to the elimination of an actual vehicle velocity or acceleration detector. For instance, a storage capacitor may be used to store electrical charge therein such that the voltage across the capacitor represents the desired reference signal. A transistor may then be connected with its emitter and collector terminals across the storage capacitor for controlling the discharge rate of the capacitor in accordance with a desired estimate of vehicle deceleration. One of the disclosed embodiments involves changing the discharge rate from a relatively low value prior to brake release to a relatively high value upon actual brake release thereby causing the initiation of and cessation of the brake release signal to be phase-advanced in compensation for inherent time lags in the vehicle hydraulic brake system.

Another embodiment of the invention utilizes control over the estimated vehicle velocity by changing the capacitor discharge rate (and hence the estimate of vehicle deceleration) inversely with respect to actual detected wheel deceleration thus compensating for different road conditions and coefficients of friction. That is, when the wheel deceleration is excessive, this would normally indicate a low coefficient of friction on the raod surface (such as an icy road) and in response to this high value of wheel deceleration, the estimate of vehicle deceleration would be accordingly lowered to bring it more nearly in line with the actual expected value of vehicle deceleration.

Another feature of this invention results in rapid "on" and "off" brake release signals both before and after a more prolonged brake release signal to result in a smoother transition to the full application of the anti-skid brake release system. Specifically, the wheel speed signal used for computing the slip ratio is changed from a low value to a high value whenever the brake release signal is present such that unless the estimated vehicle velocity is sufficiently low to maintain excessive slip (in spite of the higher wheel speed signal), the brake release signal will be terminated whereupon the wheel speed signal input to the slip calculation is again changed to its initial lower value. Thus, only when both the low and the high level wheel speed signals result in an excessive slip ratio will the brake release signal be maintained for a prolonged period. Both before and after this prolonged period of brake release the system will oscillate (in transition periods both before and after prolonged brake release) until neither the low nor the high wheel speed signals results in an excessive slip ratio.

The slip ratio used for generating the brake release signal in this invention may be computed in several different ways. A differential amplifier may be utilized with one input connected to the reference signal approximating vehicle velocity while the other input is connected to the actual detected wheel velocity. Then, when the wheel velocity decreases below a given fraction of the instantaneous reference signal, the desired brake release signal may be generated. By insuring that the critical difference is greater than any expected A.C. ripple component in the detected wheel speed signal, extraneous operation of the brake release mechanism due to such ripple components and/or other noise components may be eliminated. Furthermore, the wheel speed detecting circuit may include a voltage divider such that the capacitor storage means is only charged up to a fraction of the total available wheel speed signal. Here again, the difference between this fraction of the total available wheel speed signal and the full wheel speed signal is chosen to be greater than the expected A.C. ripple component of the wheel speed signal thereby preventing spurious operation of the brake releasing mechanism.

Figure 2:
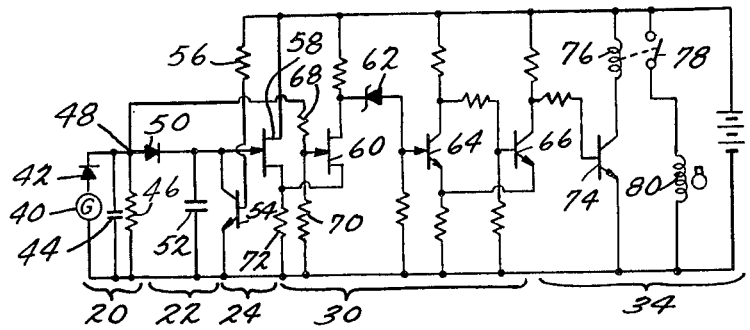
Figure 3:
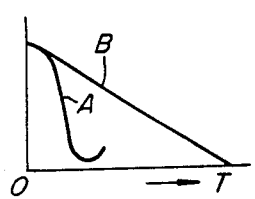
Figure 4:
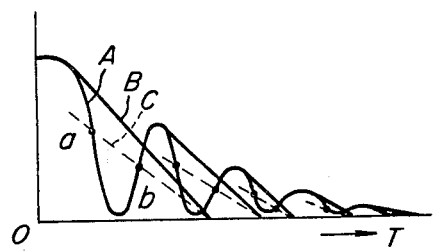
Figure 13:
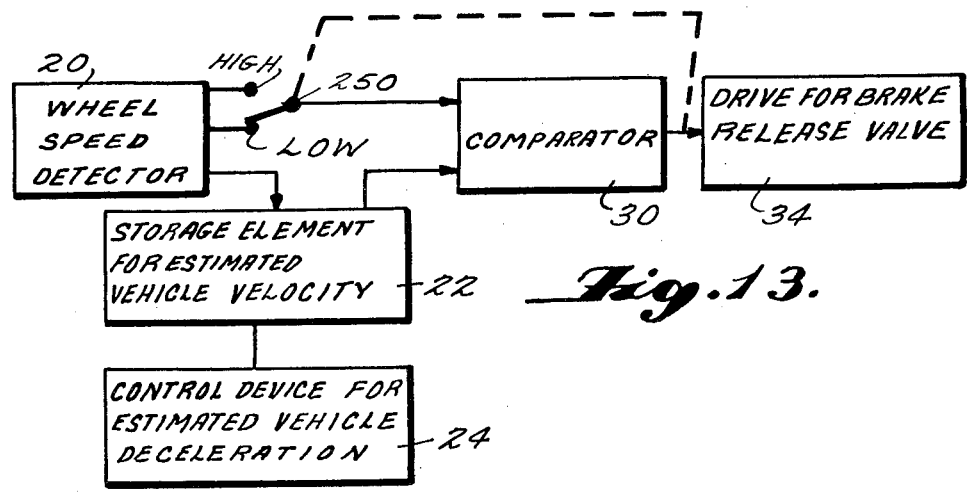
Figure 14:
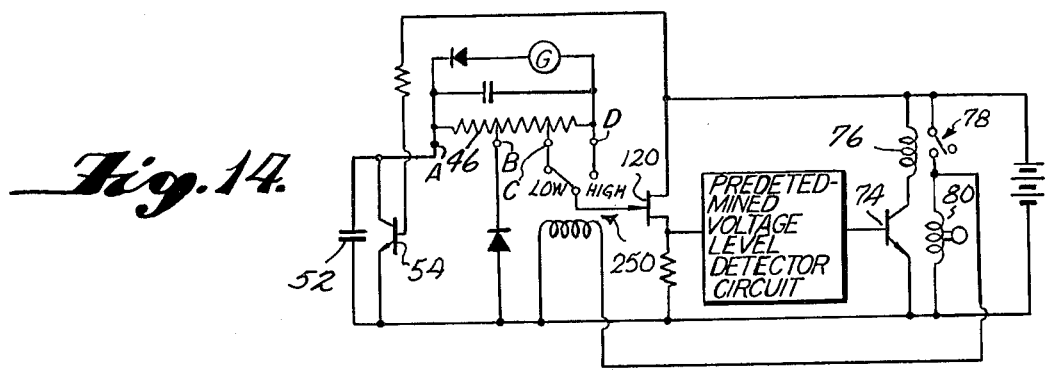
Figure 15:
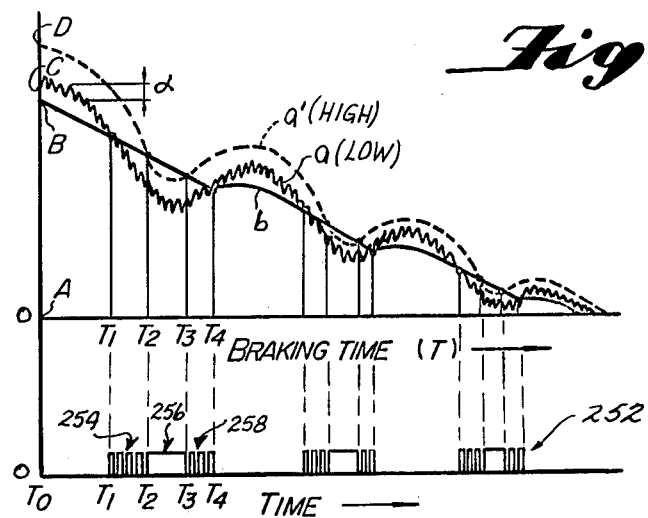

These and other advantages of this invention will be more clearly understood from the following detailed description in conjunction with the accompanying drawings, of which:

FIG. 1 is a block diagram of a basic anti-skid system constructed according to this invention, FIG. 2 is a detailed circuit diagram of the basic system shown in FIG. 1, FIG. 3 is a graph used in explaining the operation of the basic system of FIGS. 1 and 2, FIG. 4 is another graph used in explaining an actual anti-skid operation of the basic system shown in FIGS. 1 and 2, FIG. 5 is a block diagram of another embodiment of this invention representing a modification of the basic system shown in FIG. 1, FIG. 6 is a detailed circuit diagram of one embodiment of the system shown in FIG. 5, FIG. 7 is another detailed circuit diagram for another embodiment of the system shown in FIG. 5, FIG. 8 is a graph useful in explaining the operation of the systems shown in FIGS. 5, 6 and 7, FIG. 9 is a block diagram of yet another embodiment of this invention representing another modification of the basic system shown in FIG. 1, FIG. 10 is a detailed circuit diagram of the embodiment shown generally in FIG. 9, FIG. 11 is a graph useful in explaining the operation of the system shown in FIGS. 9 and 10 on road surfaces having relatively high coefficient of friction, FIG. 12 is a graph useful in explaining the operation of the system shown in FIGS. 9 and 10 on road surfaces having relatively low coefficients of friction, FIG. 13 is a block diagram of yet another embodiment of this invention representing yet another modification to the basic system shown in FIG. 1, FIG. 14 is a detailed circuit diagram of the system shown in FIG. 13, and FIG. 15 is a graph useful in explaining the operation of the system shown in FIGS. 13 and 14.

The basic system of this invention is shown in block form at FIG. 1. Here, a wheel speed detector 20 provides an output signal representing the instantaneous wheel velocity of at least one wheel of an associated vehicle. The storage element 22 is connected to the wheel speed detector 20 for storing the instantaneous or just passed maximum wheel speed as an estimate proportional to approximate vehicle velocity during normal nonbraked conditions. As will be explained in more detail below, the storage element 22 comprises a capacitor for storing electrical charge in the exemplary embodiments of this invention. However, those skilled in the art will readily appreciate that other storage elements could also be utilized for the same purpose.

During periods of normal vehicle operation, the instantaneous or just passed wheel speed will represent an approximate estimate of actual vehicle velocity. However, during periods of vehicle deceleration, some means for decreasing the estimate of vehicle velocity at a controlled predetermined rate must be employed. Such a control means 24 is shown in FIG. 1 as being connected to the storage element 22. During deceleration of the vehicle, the control element 24 causes the reference signal representing approximate estimated vehicle velocity on line 26 from storage element 22 to be decreased at a controllable rate approximating the estimated vehicle deceleration.

The reference signal on line 26 from storage element 22 representing an instantaneous estimate of instantaneous vehicle velocity is compared with the actual instantaneous wheel speed or velocity on line 28 in comparator 30. When these two signals have a predetermined relationship with respect to one another, a brake release signal is generated at line 32 and input to a brake release drive 34 such as an electromagnetic relay and/or associated drive amplifiers as should be apparent to those in the art. The predetermined relationship may be such that the actual wheel speed on line 28 is a predetermined fraction of the estimated approximate vehicle velocity on line 26 or, if these two signals already bear a predetermined ratio under normal operating conditions, the comparator 30 may detect a simple equality of the signals on lines 26 and 28.

The system of FIG. 1 is shown in more detail in FIG. 2. Here, the wheel speed detector 20 is shown as comprising a generator 40 and an associated diode 42 for rectifying the A.C. output of generator 40. This rectified output of generator 40 is then filtered by capacitor 44 and resistor 46 into a filtered D.C. signal (but of course yet retaining some A.C. ripple components) at node 48. The storage element 22 comprises a diode 50 and a capacitor 52. The diode 50 permits capacitor 52 to charge up readily to the instantaneous maximum value of the wheel speed signal at node 48. However, if the wheel speed signal at node 48 decreases, the diode 50 presents reverse current thus holding the capacitor voltage at its just past maximum value.

The control element 24 comprises a transistor 54 connected across capacitor 52 to permit controlled discharge of this capacitor. In the embodiment shown in FIG. 2, the base of transistor 54 is connected through a constant resistance 56 to a source of constant voltage such as the terminal of a car battery thus causing the discharge current through the emitter and collector terminals of transistor 54 to be maintained at constant value representing an estimated or approximated constant vehicle deceleration value.

The comparator 30 is shown in more detail in FIG. 2 as comprising FET's 58 and 60 in a differential amplifier arrangement and a preset voltage level detection circuit comprising Zenor diode 62 and associated amplifier transistors 64 and 66. A predetermined fraction of the wheel speed signal present at node 48 is applied to the gate of FET 60 through voltage divider including resistances 68 and 70 while the entire reference signal or capacitor voltage from capacitor 52 is presented directly to the gate of FET 58. The sources of both FET 58 and 60 are connected to a common resistance 72 thus providing a differential connection for this circuit. That is, the voltage at the drain of transistor 60 is a function of the difference between the gate voltages of transistors 58 and 60. Thus, if the gate voltage of FET 60 is lowered below the gate voltage of FET 58, the voltage at the drain of FET 60 will rise as a function of the voltage difference between the two gates. When the voltage at the drain of FET 60 has reached a predetermined level, the Zenor diode 62 will conduct in a reverse direction to turn on transistor 64 which, in turn, will turn off transistor 66 and thereby raise the collector voltage of transistor 66. This raised collector voltage is then input to a brake release drive 34 to turn on transistor 74 and energize the coil 76 in the collector emitter circuit of transistor 74. Coil 76 is the actuating coil of electromagnetic relay which then closes contacts of switch 78 to energize the coil 80 of an electromagnetic brake release valve. Of course, when the difference between the gate voltages of FET 58 and 60 decreases sufficiently, the voltage at the drain of FET 60 will similarly decrease to stop the reverse conduction through Zenor diode 62 thus turning transistor 64 off, transistor 66 on and transistor 74 OFF thus terminating the actuation of relay coil 76 and contacts 78 and release the brake release valve coil 80 to permit reapplication of the vehicle's brakes.

Of course, this basic embodiment provides a constant discharge current of the storage capacitor 52 which is controlled to represent an estimate of the approximate vehicle deceleration in a normal braking operation. Other embodiments to be described later will provide means for changing the rate of capacitor discharge to improve the operation of the system. However, as a first approximation, this first basic embodiment provides an acceptable reference signal representing an estimate of the approximate instantaneous vehicle velocity as well as an actual wheel speed signal for computing wheel slip and for generating a brake release signal without actually including a vehicle velocity or acceleration detector per se in the system. Accordingly, it represents a savings in both cost and complexity over wheel slip-anti skid systems which utilize such an actual vehicle velocity detector for generating the instantaneous vehicle velocity signal.

The graph shown in FIG. 3 represents the actual wheel speed signal and the reference signal representing estimated vehicle velocity during the beginning of a braking operation. Curve A represents the wheel speed or velocity signal at node 48 and the curve B represents the reference signal or the voltage on capacitor 52. As time increases along the abcissa, it may be seen that the actual wheel velocity begins to sharply decrease indicating the beginning of slip while the vehicle velocity estimate represented by curve B decreases at a constant rate representing an estimate of actual vehicle deceleration. These same curves are shown again in FIG. 4 for repeated brake applications during a single braking operation. Assuming that the comparator 30 is set to detect and generate a brake release signal whenever the wheel velocity decreases below 70 percent of the estimated vehicle velocity, then the dotted curve C in FIG. 4 represents such a 70 percent value. Thus, when the wheel velocity represented by curve A dips below the curve C as at point $a$ in FIG. 4, a brake release signal will be generated and the brakes will be automatically released whether or not the vehicle operator continues to press against the brake pedal. Since there is some inherent time delay in the hydraulic brake system of a vehicle, even after the brake release signal has been generated the brakes will continue to be applied for a short time thus explaining the continued deceleration of the wheels after point "$a$" in FIG. 4. Eventually, the brakes will actually be released and the wheels will again begin to freely rotate thus causing the wheel velocity to rise again. When the wheel velocity again passes through curve C such as at point "$b$" in FIG. 4, the brake release signal will be terminated. Again, due to the inherent delay of the vehicle's brake hydraulic system, the brakes will not be applied for a short time after point "$b$" thus causing the wheels to continue to accelerate for a short time thereafter. Eventually, the brakes are again applied and the wheel velocity again begins to decrease, this begins the entire chain of events all over again as may be seen in FIG. 4. However, since each successful cycle of brake application and brake release is of smaller amplitude, the vehicle may eventually be brought to rest in a minimum distance without skidding.

A modification of the basic system shown in FIG. 1 is shown in block form at FIG. 5. Here the operation of this modified system is basically the same as that shown in FIG. 1 except for the feedback as indicated at line 100 to the estimated vehicle deceleration control. As was previously pointed out, there is a certain amount of inherent time delay or lag in the hydraulic braking system of a vehicle. Thus, the brakes will not actually be released until sometime after the brake release signal has been generated and likewise, they will not again be applied until sometime after the brake release signal has been terminated. Accordingly, it has been discovered that the beginning and end of the brake release signal may be phase advanced by the modified system shown in FIG. 5 to result in a somewhat earlier initiation of the brake release signal and a somewhat earlier termination of that same signal to help compensate for the inherent time lags in the hydraulic brake system of the vehicle.

Specifically, the estimated vehicle deceleration prior to generation of a brake release signal, is maintained at an artificially low value such that the brake release signal will be generated earlier than usual. In addition, the feedback on line 100 (as soon as the brake release signal is initiated) then changes this value of estimated vehicle deceleration to a second higher value such that the brake release signal will be terminated somewhat earlier than usual. In this manner, the brake release signal is given a controlled degree of phase advancement to help compensate for the inherent time lags involved in the braking system.

One embodiment of the modified system shown in FIG. 5 is detailed in the circuit diagram of FIG. 6. Here, the wheel speed detector 20 and storage element 22 are substantially the same as those shown in FIG. 2. However, it should be noted that whereas the full wheel speed voltage at node 48 in FIG. 2 was applied through a voltage divider comprising resistors 68 and 70 through the gate of FET 60, in FIG. 6, the full wheel speed voltage is applied directly to the gate of transistor 60. However, the input to the storage element 22 is taken from a tapped voltage divider at point A along resistor 46. The difference between the fraction of wheel speed voltage between points A and B of resistor 46 that is applied to the storage capacitor 52 and the whole of the available wheel speed voltage between points B and C (that is the voltage appearing between points A and C) is made larger than the expected maximum peak-to-peak value of any A.C. ripple component on the wheel speed voltage thus insuring against spurious operation of the anti-skid system by such variations in the wheel speed signal.

Other than this improvement feature (which could also be incorporated in the system of FIG. 2 if desired) the operation of the comparator 30 is analogous to that already shown and explained in FIG. 2. Here, the differential output of the differentially connected FET's 58 and 60 is taken from a drain resistor 102, amplified by transistor 104 with the amplified output across resistor 106 being detected by a predetermined voltage level detector circuit such as that comprising the Zener diode and associated transistor amplifiers already described in FIG. 2.

Since the reference signal representing estimated vehicle velocity is already in a fractional portion of the full wheel speed detection voltage, a differential circuit comprising FET's 58 and 60 may be adjusted to generate the required brake release signal whenever the voltages at the gates of these transistors become equal. Thus, during a deceleration, when the wheel speed voltage applied to the gate of FET 60 becomes equal to the somewhat lower reference signal representing estimated vehicle velocity, transistor 104 will be turned on causing actuation of the predetermined voltage level detector 108 and subsequent actuation of a brake release driving transistor 74 which in turn causes energization of relay coil 76 which closes contact 78 to energize the brake release coil 80. At the same time, line 100 is energized from the power source 110 which thus adds a further bias current through resistor 112 to the base of discharge current control transistor 54. Thus, when the brake release signal is not in existence, the relay contacts 78 are open and the only base current to discharge control current 54 is through resistor 114 which provides a discharge current from storage capacitor 52 corresponding to a first low estimate of vehicle deceleration. Thereafter, when the brake release signal is provided and contacts 78 are closed, an additional bias current is supplied to the base of transistor 54 to increase the estimated vehicle deceleration by increasing the rate of discharge for capacitor 52 correspondingly.

The effect of this change from a low to a high estimate of vehicle deceleration may be understood more completely by reference to FIG. 8. Here, the curve $a$ represents the actual wheel speed signal present at node 48 including an A.C. ripple component having a peak-to-peak magnitude of $\alpha$ as shown in FIG. 8. The reference signal representing the estimated vehicle velocity is shown as curve $b$. The dotted line $b'$ shows a constant estimate of vehicle deceleration such as 1.0g without any feedback on line 100 but rather having only a constant estimate of vehicle deceleration at 1.0g similar to the operation of the system already described with respect to FIG. 2. Thus, under conditions without feedback, the brake release signal would be initiated at time $T'_1$ when the wheel speed signal represented by the curve $a$ equals the instantaneous estimate of vehicle velocity represented by the curve $b'$. Similarly, without feedback, the brake release signal would be terminated at time $T'_3$. It would again be initiated at time $T'_5$, etc.

However, with the feedback along line 100 as shown in FIG. 6, and with an adjustment of resistor 114 to represent an initially lower value of estimated vehicle deceleration such as 0.4g, and with the additional bias current from resistor 112 being adjusted to represent a combined bias current to the base of transistor 54 representing a higher than normal vehicle deceleration such as 1.5g, the operation is quite different. Here, as shown in FIG. 8, the curve $b$ representing the estimate of vehicle velocity intercepts the curve $a$ representing wheel velocity at an earlier time $T_1$. Likewise, the time for termination of the brake release signal occurs at a somewhat earlier time $T_3$ due to the increased slope of curve $b$ during the time that the brake release signal exits. Thus, the brake release signal occurs somewhat earlier ($T'_1$ minus $T_1$) and also terminates somewhat earlier ($T'_3$ minus $T_3$) than would have been the case with a constant estimate for vehicle deceleration such as used in the system of FIG. 2. Accordingly, the inherent time lags in the hydraulic brake system of the vehicle are anticipated to compensate for their undesirable effects.

Another embodiment of the system of FIG. 5 is shown in FIG. 7. Here, the operation is substantially the same as that shown in FIG. 6 and, in fact, the graphs of FIG. 8 may be applied exactly as in the previous explanation to understand the operation of the circuit in FIG. 7. Like reference numerals have been used in these two figures to designate like elements. The real difference between circuits shown in FIG. 6 and FIG. 7 is a somewhat different arrangement of the storage element and wheel speed detector to permit elimination of the differential circuit comprising the FET elements. Here, the input to the gate of FET 120 is already the difference between the voltage across storage capacitor 52 and the total wheel speed signal across resistor 46. As before, the reference signal stored on capacitor 52 is taken from a tapped voltage divider at point A with the voltage between points A and C being at least greater than the estimated peak-to-peak A.C. ripple component to prevent spurious operation of the brake release signal caused by the A.C. ripple component. As with the system shown in FIG. 6, the transistor 54 controls the discharge current from storage capacitor 52 to a first constant rate estimate representing an estimate of vehicle deceleration that is low such as 0.4g and, when the contacts 78 are closed, an additional biasing current is provided to raise the effective discharge rate to represent a new second higher level of vehicle deceleration such as 1.5g. Thus, the slope of the reference voltage representing estimated vehicle velocity is first somewhat lower than normal to cause an early initiation of the brake release signal and it is thereafter changed to a much steeper slope for the duration of the brake release signal to cause termination of that signal at a somewhat earlier point in time in compensation for the inherent hydraulic brake time delays.

A further modification of the basic system of FIG. 1 is shown in block form at FIG. 9. Here, the basic operation is again quite similar to that already described for the system of FIG. 1. However, there is now provided a feedback loop from the wheel sped detector 20 to the control device 24 to provide an automatic and continuous control of the rate of discharge of storage capacitor 52 as a continuously variable estimate of approximate vehicle deceleration which depends upon the wheel deceleration actually detected. The estimate of vehicle deceleration is changed inversely with respect to detected wheel deceleration such that the estimated vehicle deceleration is continuously changed in compensation for various road conditions, such as the change between icy roads and relatively hard dry surface roads. That is, if the wheel deceleration actually detected is high, this indicates operation on a somewhat slippery surface and the control device 24 is automatically changed to represent a correspondingly lower estimate for the actual vehicle deceleration. On the other hand, if the wheel deceleration is low, indicating operation on a relatively hard surface or dry road, the control device 24 provides a correspondingly higher estimate for the actual vehicle deceleration. In this manner, the reference signal representing an estimate of vehicle velocity from storage element 22 is made to correspond more closely with the actual vehicle velocity.

Specifically, a wheel deceleration circuit 150 is connected to the wheel speed detector for generating an output signal representing wheel deceleration, i.e., a differentiation circuit. Additionally, a delay and smoothing circuit 152 may be inserted between the differentiation circuit 150 and the control device 24 to prevent spurious changes in the estimate of vehicle deceleration which might otherwise be caused by noise signals occurring during transmission shifting and/or operation on gravel roads, etc.

The circuit diagram shown in FIG. 10 shows the system of FIG. 9 in more detail. Here, the wheel speed detector 20, storage element 22, comparator 30 and brake release drive 34 operate analogously to the operations already described with respect to the previous embodiments of this invention. Thus, the reference signal representing estimated vehicle velocity across capacitor 52 is compared with the wheel speed voltage across resistor 46 in the base emitter circuit of transistor 200. As before, only a fraction of the total available wheel speed signal is utilized in generating the reference signal representing estimated vehicle velocity. The difference between this fraction and the total available wheel speed signal is, as before, greater than the estimated peak-to-peak A.C. ripple component of the wheel speed voltage to prevent spurious operation of the brake release mechanism. Thus, when the voltage across capacitor 52 representing the reference signal or estimated vehicle velocity becomes greater than the voltage across resistor 46, the base emitter of transistor 200 is forwardly biased causing an increase in current in resistor 202 which, in turn forwardly biases the base emitter circuit of transistor of 204 turning this transistor on. When transistor 204 turns on, this in turn provides base current to transistor 206 which turns on to energize the relay coil 76 as in previously explained embodiments.

However, in this embodiment, the feedback from the wheel speed detector along line 198 is input to an inverter/amplifier transistor 208. The output of this amplifier is then differentiated by the usual R-C differentiator comprising capacitor 210 and resistor 212. The differentiated output of the wheel deceleration detector 150 then represents the wheel deceleration. This signal is then filtered somewhat by the R-C circuit and amplifier of element 152 before being used to control the base current of transistor 54, through its emitter collector circuit, controls the discharge current from storage capacitor 52 to represent the estimated vehicle deceleration.

Thus, when the vehicle wheel speed decreases, this signal is inverted by amplifier 208 into an increasing level which is then differentiated in circuit 150 and applied through the R-C filter network and amplifier of element 152 to control the base current to the discharge current control transistor 54. Thus, because of the inversion of amplifiers 208 and 214, the estimated vehicle deceleration is controlled inversely with respect to the actual detected wheel deceleration. That is, when the wheel deceleration is increasing, base current supplied to transistor 54 will be decreasing to decrease the rate of discharge for storage capacitor 52.

As shown in FIG. 11, the operation of the circuit in FIG. 10 may be explained for a relatively hard dry surface road having a high coefficient of friction. Here, the wheel speed signal represented by the curve $a$ and the reference signal representing the estimated vehicle velocity is represented by the curve $b$. Since the wheel deceleration magnitude is relatively low at all times, the changes in the estimated vehicle deceleration are quite small and the circuit operates much as that shown in FIG. 2 with a relatively constant estimate for vehicle deceleration resulting in successive brake release signals of relatively short duration as shown in FIG. 11.

However, when the system is used on a vehicle travelling along an icy road having a relatively low coefficient of friction, a different situation results as shown in FIG. 12. Here, the curve $a$ again represents the actual detected wheel velocity while the curve $b$ represents the reference signal or estimated vehicle velocity. The curve $c$ represents the wheel deceleration signal output from differentiator 150 while the curve shown in dotted line at $d$ represents the output of the R-C smoothing and time delay circuit in element 152. Thus, the transistor 214 is provided with a substantial base current as shown by the dotted line $e$ which, in turn, results in a lowering of the collector to emitter impedance of transistor 214 and a correspondingly lower value of base bias for control transistor 54. Accordingly, although the original base bias for transistor 54 will represent a relatively higher value of estimated vehicle deceleration such as 1.0g shown by dotted line $e$ in FIG. 12, the operation of transistor 214 to lower the bias base current for transistor 54 will result in an actual estimate for vehicle deceleration that is considerably lower, such as 0.2g shown by the actual curve $b$ representing the reference signal for this operation on a relatively low coefficient of friction surface. Thus, the brake release signals 216 shown in FIG. 12 have a considerably longer duration than those shown in FIG. 11 due to the decreased slope of curve $b$ representing a considerably lower estimate for vehicle deceleration in accordance with the actual road conditions.

Yet another modification of the basic system shown in FIG. 1 is described in block diagram form at FIG. 13. Here, the basic operation of the system is again quite similar to that shown in FIG. 2 for the basic system. However, the wheel speed detector 20 provides both a low and high output terminal and there is provided feedback from the brake release signal to the switching means 250 for switching between the high and low levels of available wheel speed signal. This utilized for causing an unstable condition of oscillation immediately before and after prolonged periods of actual brake release signals such that in these transition periods, there occur a series of rapid short duration brake release signals to help make the operation of the anti-skid system more smooth. That is, immediately before the brakes are actually released for a significant duration of time, the brakes are released for very short periods of time in rapid succession. Likewise, immediately after the actual long duration brake release signal terminates, the brakes are again released in a series of short duration brake release periods to help ease the transition both before and after the actual brake release signal is applied to the system.

Basically, this is accomplished by initially connecting comparator 30 to the low value of available wheel speed signal as shown in FIG. 13. Thereafter, when the brake release signal is initiated, the switching means 250 changes the comparator input to the high value of wheel speed signal. Thus, unless this higher value of wheel speed signal also meets the conditions for brake release, the comparator 30 will quickly terminate the just initiated brake release signal and switching means 250 will again input the low value of wheel speed signal to the comparator 30. If the conditions for brake release are still met by the low value of the wheel speed detector in this position, then, the comparator 30 will again initiate a brake release signal which will again cause switching of switch means 250 to the high value of wheel speed signal etc. Only when both the high and low values of available wheel speed signal meet the predetermined conditions for brake release, will the brake release signal remain on for any considerable duration of time. Thus, whenever only the low terminal wheel speed signal meets the conditions for a brake release, then the unstable conditions for oscillation exists and only the relatively short duration brake release pulses will be generated. Of course, when the signal available at the low value terminal fails to meet the conditions for brake release, no brake release signal at all will be generated.

A detailed circuit diagram of such a modified system is shown in FIG. 14. All the elements in FIG. 14 are very similar to those already discussed with respect to FIG. 7 and the other embodiments of this invention with the exception of an additional tap on the voltage divider 46. Here, the switch means 250 comprises a relay and its associated contacts which is energized simultaneously with the electromagnetic brake release valve actuator coil 80. The operation of the system may be understood in detail by observing, in FIG. 15, the various wave forms of the system. Here, the wave form $a$ represents the actual value of the wheel speed signal available at the low ouput terminal of detector 20. The mean value of this signal available at the high output terminal is shown as curve $a'$. The reference signal representing the estimated vehicle velocity is shown as curve $b$. The brake release signals are shown at 252. Thus, in the time span between $T_0$ and $T_1$, both the curves $a$ and $a'$ are above the reference curve $b$ and no brake release signals are at all generated. Then, at time $T_1$, the low value of the wheel speed signal represented by curve $a$ passes through the reference curve $b$. However, since the high level output of the detector represented by curve $a'$ has still not crossed the reference curve, the unstable conditions for oscillation exist between the time $T_1$ and $T_2$, and a series of short brake release signals will be generated as shown at 254. After time $T_2$, both the signal at the high and low terminals of detector 20 are below the reference signal represented by curve $b$ and thus, in this time period the conditions for a stable prolonged brake release pulse are met and until the signal at the high level terminal again passes above the reference signal, at time $T_3$, a prolonged brake release signal as shown at 256 is provided to cause an automatic release of the vehicle brake system. Then, between time $T_3$ and $T_4$ when only the low level signal from detector 20 is again below the reference signal, the conditions for unstable oscillation again occur and another series of short brake release pulses are produced as shown at 258. This operation is again repeated at successive intervals as shown in FIG. 15 until the vehicle is brought to a complete stop. It should be appreciated by those in the art that such short pulses in the transition period both before and after the more prolonged brake release pulses helps make the operation of the anti-skid system more smooth than otherwise.

Although the various improvements in this system have been broken down into several different embodiments for the purposes of illustration and to facilitate explanation, it should be apparent to those in the art that the various embodiments described above are not mutually exclusive and that many of the improvements may be incorporated into a single improved system. In addition, while only a few specific embodiments of this invention have been described above, those skilled in the art will readily appreciate that these specific systems may be easily subjected to minor modifications without departing from the spirit of the invention. For instance, although a capacitor has been shown as the storage element 22, those skilled in the art will appreciate that other elements could also be used for storage means (i.e., the current through an inductor rather than the voltage across the capacitor, etc.). Accordingly, all such modifications are intended to be included within the scope of this application.

What is claimed is:

1. An anti-skid system for wheeled vehicles having compensation for advancing the phase of brake reapplication in anticipation for and compensation of inherent time lags in the hydraulic brake system of the vehicle, said anti-skid system comprising:

a wheel speed detector operatively associated with the rotation of at least one vehicle wheel for generating an electrical voltage signal proportional to instantaneous wheel speed, voltage supply means connected to receive the instantaneous wheel speed signal from said wheel speed detector and for providing a charging signal of lesser magnitude at a charging terminal, a rectifier connected to said charging terminal, a capacitor connected to said rectifier for storing a wheel speed voltage signal representative of the successive maximum signal values supplied by said charging terminal of said voltage supply means, said stored signal to be used as an estimated vehicle velocity voltage signal, a discharge active element connected across said capacitor and also having a control terminal and discharge control means for controlling the discharge of current from the capacitor through the active element, a control circuit arrangement including said voltage supply means, said capacitor, said discharge active element and said discharge control means, said control circuit arrangement having an output terminal providing a difference signal representing the difference between said estimated vehicle velocity signal stored in said capacitor and the instantaneous wheel speed signal, comparing means having an input connected to compare said difference signal with a reference signal and to supply a brake release signal when said difference signal and said reference signal satisfy a predetermined relationship, and feedback means connected between said comparing means and said control circuit arrangement so as to increase the controlled rate at which the vehicle velocity signal is reduced in response to the occurrence of a brake release signal thereby advancing the phase of brake reapplication in anticipation for and compensation of inherent time lags in the hydraulic brake system of the vehicle.

2. An anti-skid system according to claim 1, wherein:
said discharge active element comprises a transistor having collector and emitter terminals connected across the capacitor,
said discharge control means comprises a discharge current limiting circuit for setting the base current of said transistor at a predetermined value, and
said feedback means comprises a switching means connected to increase the rate at which current is discharged from said capacitor in response to the occurrence of said brake release signal.

3. An improved anti-skid system for vehicle which effectively utilizes an approximated slip ratio between vehicle velocity and wheel velocity to generate a brake release signal for a brake release valve without actually utilizing a vehicle velocity detector, said improved system comprising:
a wheel speed detector means for generating a wheel speed signal corresponding to the instantaneous wheel speed of at least one wheel of said vehicle;
a vehicle velocity estimation means connected to said wheel speed detector means for generating a vehicle velocity signal proportional to the successive maximum magnitudes of instantaneous wheel speed but reduced from such maximum values at a controlled rate;
control circuit means connected with said wheel speed detector means and with said vehicle velocity estimation means and producing a brake release signal whenever the difference between the wheel speed signal and the vehicle velocity signal reaches a predetermined level;
feedback means connected to control at least one of said wheel speed detector means and said vehicle velocity estimation means in response to the occurrences of said brake release signal;
said feedback means being connected to the vehicle velocity estimation means so as to increase the controlled rate at which the vehicle velocity signal is reduced in response to the occurrence of a brake release signal thereby advancing the phase of brake reapplication in anticipation for and compensation of inherent time lags in the hydraulic brake system of the vehicle.

4. An anti-skid system for wheeled vehicles comprising:
a wheel speed detector operatively associated with the rotation of at least one vehicle wheel for generating an electrical voltage signal proportional to instantaneous wheel speed,
voltage supply means connected to receive the instantaneous wheel speed signal from said wheel speed detector and for providing a charging signal of lesser magnitude at a charging terminal,
a rectifier connected to said charging terminal,
a capacitor connected to said rectifier for storing a wheel speed voltage signal representative of the successive maximum signal values supplied by said charging terminal of said voltage supply means, said stored signal to be used as an estimated vehicle velocity voltage signal,
a discharge active element connected across said capacitor and also having a control terminal and discharge control means for controlling the discharge of current from the capacitor through the active element,
a control circuit arrangement including said voltage supply means, said capacitor, said discharge active element and said discharge control means, said control circuit arrangement having an output terminal providing a difference signal representing the difference between said estimated vehicle velocity signal stored in said capacitor and the instantaneous wheel speed signal,
comparing means having an input connected to compare said difference signal with a reference signal and to supply a brake release signal when said difference signal and said reference signal satisfy a predetermined relationship,
feedback means connected to change the difference signal in response to the occurrence of said brake release signal so as to at least partially compensate for time lags which occur in actually releasing and applying braking forces in response to the brake release signal,
said voltage supply means including voltage dividing means provided with said instantaneous wheel speed voltage signal and supplying said charging signal, and
said feedback means comprising a switching means having first and second input terminals connected to said voltage dividing means and an output terminal connected to said control circuit arrangement, said switching means being connected to change the connection of said output terminal from said first input terminal to said second input terminal when said brake release signal is generated.

5. An anti-skid system for wheeled vehicles comprising:
a wheel speed detector operatively associated with the rotation of at least one vehicle wheel for generating an electrical voltage signal proportional to instantaneous wheel speed,
voltage supply means connected to receive the instantaneous wheel speed signal from said wheel speed detector and for providing a charging signal of lesser magnitude at a charging terminal,
a rectifier connected to said charging terminal,
a capacitor connected to said rectifier for storing a wheel speed voltage signal representative of the successive maximum signal values supplied by said charging terminal of said voltage supply means, said stored signal to be used as an estimated vehicle velocity voltage signal,
a discharge active element connected across said capacitor and also having a control terminal and discharge control means for controlling the discharge of current from the capacitor through the active element,
a control circuit arrangement including said voltage supply means, said capacitor, said discharge active element and said discharge control means, said control circuit arrangement having an output terminal providing a difference signal representing the difference between said estimated vehicle velocity signal stored in said capacitor and the instantaneous wheel speed signal,
comparing means having an input connected to compare said difference signal with a reference signal and to supply a brake release signal when said difference signal and said reference signal satisfy a predetermined relationship, feedback means connected to change the difference signal in response to the occurrence of said brake release signal so as to at least partially compensate for time lags which occur in actually releasing and applying braking forces in response to the brake release signal, and said discharge control means being connected to said feedback means and comprising first and second discharge current limiting circuits, whereby said feedback means changes a discharge control current supplied to the discharge control means from one of two different levels to the other thereof when said brake release signal has been generated.

6. An anti-skid system according to claim 5, wherein said feedback means comprises an electromagnetic relay connected to respond to the brake release signal and having a switching means associated therewith, said switching means having an input terminal connected to a voltage source and an output terminal connected to said discharge control means.

7. An anti-skid system according to claim 6, wherein said second discharge current limiting circuit comprises a reverse-current blocking diode connected in circuit with the output terminal of said switching means.

8. An improved anti-skid system for a vehicle which effectively utilizes an approximated slip ratio between vehicle velocity and wheel velocity to generate a brake release signal for a brake release valve without actually utilizing a vehicle velocity detector, said improved system comprising:

a wheel speed detector means for generating a wheel speed signal corresponding to the instantaneous wheel speed of at least one wheel of said vehicle;

a vehicle velocity estimation means connected to said wheel speed detector means for generating a vehicle velocity signal proportional to the successive maximum magnitudes of instantaneous wheel speed but reduced from such maximum values at a controlled rate;

control circuit means connected with said wheel speed detector means and with said vehicle velocity estimation means and producing a brake release signal whenever the difference between the wheel speed signal and the vehicle velocity signal reaches a predetermined level;

feedback means connected to control at least one of said wheel speed detector means and said vehicle velocity estimation means in response to the occurrences of said brake release signal; and said feedback means being connected to the wheel speed detector means so as to increase said wheel speed signal to a proportional higher value during brake release periods so as to cause cessation of the brake release signal unless such higher value also satisfies the predetermined conditions for brake release thereby resulting in oscillation of said brake release signal both before and after relatively longer applications of said brake release signal and smoothing the overall anti-skid system operation.

* * * * *